F. M. ALLEN.
MACHINE FOR TESTING THE LIFE OF TYPE WRITER RIBBONS.
APPLICATION FILED SEPT. 23, 1910.
1,013,832.
Patented Jan. 2, 1912.
2 SHEETS—SHEET 1.
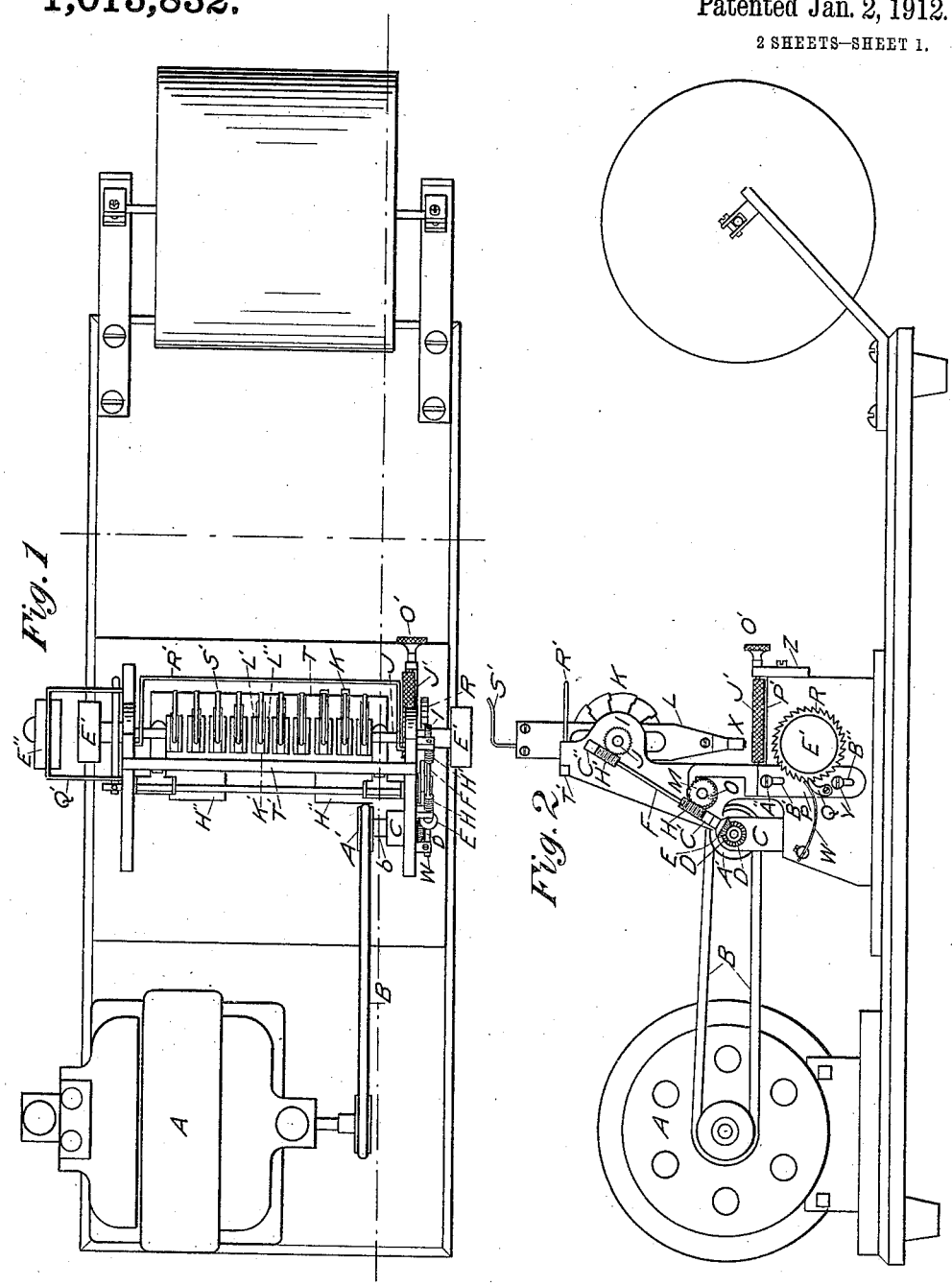

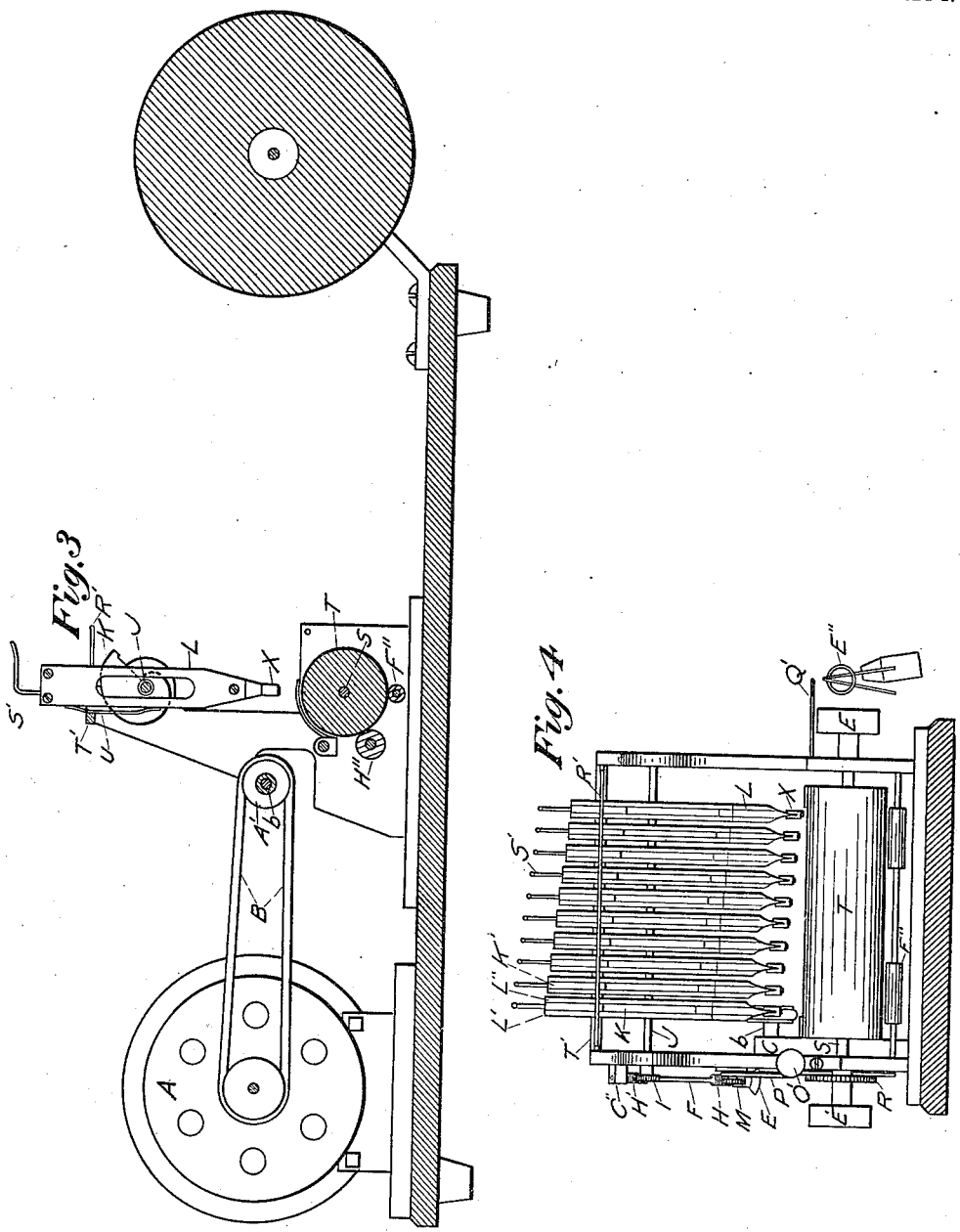

UNITED STATES PATENT OFFICE.

FRANK M. ALLEN, OF WASHINGTON, DISTRICT OF COLUMBIA.

MACHINE FOR TESTING THE LIFE OF TYPE-WRITER RIBBONS.

1,013,832. Specification of Letters Patent. Patented Jan. 2, 1912.

Application filed September 23, 1910. Serial No. 583,515.

(DEDICATED TO THE PUBLIC.)

*To all whom it may concern:*

Be it known that I, FRANK M. ALLEN, an employee of the Department of Agriculture of the United States of America, residing in the city of Washington, District of Columbia, (whose post-office address is Washington, District of Columbia,) have invented a new and useful Machine for Testing the Life of Type-Writer Ribbons.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to me of any royalty thereon.

My invention relates to a machine for testing the life of typewriter ribbons.

The object of my invention is to produce a machine which is suitable for testing the durability of typewriter ribbons. Heretofore, no mechanism known to me is adapted for accomplishing this purpose.

By employing my invention, an operator can easily and accurately approximate the quantity of work that a typewriter ribbon can do in its ordinary use before being worn out.

This invention is of practical benefit to manufacturers of typewriter ribbons and buyers of such article in large quantities.

The nature, characteristic features and scope of my invention will be more fully understood from the following description, taken in connection with the accompanying drawings, forming a part hereof, wherein—

Figure 1 is a plan view of my invention. Fig. 2 is a side view of the same. Fig. 3 is a longitudinal sectional view; and Fig. 4 is a cross sectional view of my invention.

Referring to the drawings, A represents the electric motor for furnishing power for operating the machine. The power is transmitted by a round belt, B, to a small grooved pulley, A'. This pulley, A', is secured to a shaft, b, which passes through a bearing, C, that is attached to the machine housing. On the shaft, b, is a bevel gear, D, which is adapted to engage another bevel gear, E, secured to the worm shaft, F.

F, indicates a shaft which passes through bearings C' and C''. These bearings C' and C'' constitute a part of the machine housing.

On worm shaft, F, at proper positions are located worms, H and H'. The worm H' engages the worm gear, I, and is secured to the main shaft, J, which has its bearings in the machine housing. The main shaft, J, carries a series of cams, K, preferably ten in number, suitably arranged thereon at proper intervals. These cams, K, are not regular curves but have straight portions, so as to afford a rest of 10 deg. when raised at their extreme height. The cams, K, have a fall of 1.8 cm. thereby insuring a uniform blow when allowed to fall. Said cams K, are so arranged as to have contact with the hammers, L. Said hammers, L, are constructed in four pieces having two sides, L' and L'', with type letters X, attached at the bottom thereof and cam piece K' secured thereto, which said parts are firmly secured together by three small screws and two dowel pins.

The type letters are of the same size and style that are employed on standard typewriters and consist of ten capital letters and ten small letters, one capital letter and one small letter being mounted on each hammer. All bearings of the machine are hardened and finished. Cams, K, elevate hammers, L, to the highest position and then allow said hammers to drop of their own weight. The hammers, L, are of equal weight, and the cams, K, are timed so that they follow each other at intervals of 20 degrees of the circumference in order to permit the preceding hammer sufficient time to raise from its lowest position, thus leaving the ribbon free for the next impression.

The worm, H, is in contact with worm gear, M, on stud bearing, N, which is secured to the machine housing. On worm gear, M, is a pin, O. After the last hammer, L, on the extreme right of the machine has started to raise, said pin, O, comes in contact with pawl carrier, P, having mounted thereon a pawl, Q, which engages the ratchet wheel R, on shaft, S, or platen roll, T, and the next 30 degrees of the rotary action of the worm gear, M, causes the pin, O, to raise pawl carrier, P, and carry with it pawl, Q, having contact with the ratchet, R, thereby revolving the platen roll, T, the desired distance for spacing. When the desired spacing has been obtained, the pawl carrier, P, returns to rest by means of a flat spring, W, conveniently arranged in the machine housing and adapted to throw the pawl carrier, P, in position after performing its functions in connection with the operation of the platen roll, T. Pawl carrier, P, is secured to the machine housing by two round headed screws, A″ and Y, and said carrier works vertically on said screws in open slots B′ and B″ for bearings.

Pawl Q, is secured to the pawl carrier, P, by means of a round headed stud screw. The platen roll, T, is a standard typewriter platen roll, and the shaft, S, holding the said platen roll, has screwed to it in proper position a ratchet wheel, R. On both sides of said platen roll, T, are located hard rubber hand wheels, E′, adapted for adjusting the paper. Arranged below the said platen roll, T, is a small feed roll, F″, secured in bearings in the machine housing, and located in the rear of the platen roll, T, is a large roll, H″, similarly secured in the machine housing.

J′ is a rotary ribbon clamp, the same being an eccentrically mounted knurled cylinder having one of its bearings in the machine housing. An outer bearing, Z, is attached to the machine housing by a screw, and dowel pin. Located in ribbon clamp, J′, is a shaft, and on said shaft is a knurled thumb operated wheel, O′. This ribbon clamp, J′, is mounted so that the last 10 degrees of its eccentric action produces a wedge effect upon a ribbon support, P′. On the right hand side of the machine housing and attached thereto is a ribbon support, Q′.

The hammers, L, are disengaged from the action of the cams, K, by a hammer lift, R′. When the hammer lift R′, is rotated into a vertical position, it comes eccentrically in contact with the hammer supports, S′, and lifts the hammers, L, clear of the cams, K, thereby allowing free adjustment of ribbons or papers.

T′, is a cross-tie rod, and screwed thereto are balance springs, U U, the function of which is to balance hammers, L, in a vertical plane and just as the cams, K, release said hammers, L, the said balance springs, U U, cause the hammers, L, to fall vertically on platen roll, T, thereby insuring a perfect impression. The machine housing is mortised in a bed plate, fastened at the top by tie rod, T′.

E″, is a weight with ribbon clamp at the extreme right of the machine. This weight and clamp are a constant factor in the tension on the sectional ribbon being tested.

In practicing my invention the ribbon to be subjected to a test is placed in proper position, and the motor, A, is started by turning on the electric current, thus producing the necessary power to operate the pulley, A′. The pulley, A′, communicates the motion to the bevel gear, D, which in turn engages another bevel gear, E, attached to and constituting a part of the worm shaft, F. The bevel gear, E, revolves the worm shaft, F, and operates the main shaft, J, by means of the worm, H′ engaging the worm gear, I, attached to the said main shaft, J. When motion is thus communicated to the shaft J, said shaft raises the cams, K, in consecutive order, and the cams coming in contact with hammers, L, elevate said hammers alternately to the desired height and permit them to fall one after another in consecutive order of their own weight, upon the ribbon being tested. The impact of the hammers, L, upon the ribbon leaves an impression on the paper carried on platen roll, T, similar to the print made by typewriter keys. After the last of the series of hammers, L, has started to raise in the manner indicated, the pin O, arranged on worm gear, M, comes in contact with pawl carrier, P, and on which said carrier is pawl, Q, which engages the ratchet wheel R. Upon the expiration of 30 degrees of the rotary action of the worm gear, M, the pin, O, thereupon raises the pawl carrier, P, which carries with it the pawl, Q, and the said pawl, Q, in being so raised moves the ratchet, R, a sufficient distance to cause the platen roll, T, to revolve the desired distance for spacing. When this action is performed, the paper upon which the impression is being made is conveniently spaced for a new impression, and the pawl carrier, P, is returned to rest by means of the flat spring, W.

The machine is operated in the above described manner until the ribbon has been worn out. It is only necessary to test a portion of the ordinary typewriter ribbon. After the portion of ribbon subjected to a test has become exhausted from effectual use the life of a ribbon is determined by counting the number of impressions made by the portion of ribbon tested and estimating arithmetically therefrom the probable number of impressions that an entire ribbon of the kind tested may be capable of making.

Having thus described my invention, I claim,

1. In a machine of the character described, comprising a machine housing, a pulley, a shaft for supporting said pulley and carrying thereon a bevel gear, a second shaft provided with worms at both ends and having a bevel gear secured to one end, said bevel gear engaging the bevel gear on said first mentioned shaft, a revolving shaft supporting a series of cams and provided with a worm gear, a worm gear pivoted to said machine housing, one of the worms on said second shaft engaging said first mentioned worm gear and the other having contact with said last mentioned worm gear, a series of hammers resting on said cams, said revolving shaft adapted for elevating consecutively the said cams, thereby causing the elevation of said hammers and allowing said hammers to fall voluntarily in consecutive order, means for operating said apparatus and testing the life of a typewriter ribbon, substantially as specified.

2. In a machine of the character described, consisting of a machine housing, a worm gear pivoted to said machine housing, a pulley, a shaft for supporting said pulley and carrying thereon a bevel gear, a second shaft provided with worms at both ends and having a bevel gear secured to one end adapted to engage the bevel gear carried by said first mentioned shaft, a main shaft supporting a series of cams and provided with a worm gear, said worm gear engaging one of the worms on said second shaft, and the other worm on said shaft having contact with said first mentioned worm gear, a plurality of hammers resting on said cams, said hammers having type-letters mounted thereon, means for communicating motion to said pulley bevel gears and worm shafts, for revolving said main shaft.

3. In a machine of the character described, comprising a machine housing, a worm gear pivoted to said machine housing, a pulley, a shaft for supporting said pulley and carrying a bevel gear thereon, a second shaft provided with worms at both ends and having a bevel gear secured to one end, said bevel gear engaging the bevel gear carried by said first mentioned shaft, a main shaft for supporting a plurality of cams and provided with a worm gear, said worm gear engaging one of the worms on said second shaft and the other worm on said shaft having contact with said first mentioned worm gear, a plurality of hammers having type letters mounted thereon, said hammers adapted to rest on said cams, means for communicating motion to said mentioned parts, said main-shaft being adapted to revolve and elevate said cams alternately, said hammers responding alternately to the elevation of said cams, and falling voluntarily, supports and clamps for holding a typewriter ribbon, a platen roll for carrying paper, a shaft for supporting said platen roll having a ratchet wheel attached thereto, a pawl having mechanical connection with the main shaft and adapted to automatically engage the said ratchet wheel and produce a forward motion of said platen roll for spacing substantially as specified.

4. In a machine of the character described, comprising a machine housing, a pulley, a shaft for supporting said pulley and carrying thereon a bevel gear, a second shaft provided with worms at both ends and having a bevel gear secured to one end, said bevel gear being adapted to engage said first mentioned bevel gear, a worm gear pivoted to the machine housing, a revolving main-shaft carrying a series of cams and provided with a worm gear, said worm gear engaging one of the worms on said second shaft and the other worm on said shaft having contact with said worm gear pivotally secured to the machine housing, said cams supporting a series of hammers having type letters mounted thereon, a pawl having mechanical connection with said main-shaft and adapted to respond automatically to its rotation, a platen roll supported by a shaft having a ratchet wheel attached thereto, means for holding a ribbon in proper position, and means for communicating motion to said parts for testing the life of a typewriter ribbon by impact, substantially as specified.

In testimony whereof, I affix my signature in the presence of two subscribing witnesses.

FRANK M. ALLEN.

Witnesses:
ARTHUR SMITH,
H. P. MCDOWELL.

---

Copies of this patent may be obtained for five cents each, by addressing the "Commissioner of Patents, Washington, D. C."